(12) United States Patent
Perra et al.

(10) Patent No.: US 10,756,652 B2
(45) Date of Patent: Aug. 25, 2020

(54) MOTOR PROTECTION AND CONTROL APPARATUS, SYSTEM, AND/OR METHOD

(75) Inventors: Andre Pierre Perra, Portland, OR (US); Kent Jeffrey Holce, Portland, OR (US); Scott E. Leonard, Portland, OR (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 827 days.

(21) Appl. No.: 13/606,004

(22) Filed: Sep. 6, 2012

(65) Prior Publication Data

US 2013/0242439 A1 Sep. 19, 2013

Related U.S. Application Data

(60) Provisional application No. 61/531,610, filed on Sep. 6, 2011.

(51) Int. Cl.

| | |
|---|---|
| *H02P 1/04* | (2006.01) |
| *H02H 7/085* | (2006.01) |
| *H02P 25/22* | (2006.01) |
| *H02K 11/20* | (2016.01) |
| *H02H 3/08* | (2006.01) |
| *H02K 3/28* | (2006.01) |
| *H02P 1/32* | (2006.01) |

(52) U.S. Cl.
CPC ............... *H02P 1/04* (2013.01); *H02H 3/08* (2013.01); *H02H 7/085* (2013.01); *H02K 11/20* (2016.01); *H02P 25/22* (2013.01); *H02K 3/28* (2013.01); *H02P 1/32* (2013.01)

(58) Field of Classification Search
CPC . H02P 1/04; H02K 11/20; H02H 3/08; H02H 7/085

USPC ................................. 361/1, 23, 31
See application file for complete search history.

(56) References Cited

U.S. PATENT DOCUMENTS

| | | | |
|---|---|---|---|
| 4,267,967 A | 5/1981 | Beck et al. | |
| 4,710,841 A | 12/1987 | Bottrell | |
| 4,719,560 A | 1/1988 | Ford | |
| 4,743,816 A | 5/1988 | Prather | |
| 4,980,624 A | 12/1990 | Bernhardt | |
| 5,012,168 A | 4/1991 | Dara et al. | |

(Continued)

FOREIGN PATENT DOCUMENTS

| | | |
|---|---|---|
| CN | 1013397 | 3/1989 |
| FR | 2696884 | 4/1994 |

(Continued)

OTHER PUBLICATIONS

International Preliminary Report on Patentability received for PCT Patent Application No. PCT/US12/54003, dated Dec. 23, 2013, 17 pages.

(Continued)

*Primary Examiner* — Kawing Chan
(74) *Attorney, Agent, or Firm* — Faegre Drinker Biddle & Reath LLP

(57) ABSTRACT

In the field of motor protection for industrial automation systems, HVAC systems, pumping systems, and/or similar implementations, improved motor starters and overload electronics can be configured to offer substantially automatic levels of protection for motors, independent of such starters and/or overload electronics first being calibrated for, or properly calibrated for, the motor.

8 Claims, 3 Drawing Sheets

(56) References Cited

U.S. PATENT DOCUMENTS

| | | |
|---|---|---|
| 5,448,442 A | 9/1995 | Farag |
| 5,483,139 A | 1/1996 | Welles, II |
| 5,506,485 A | 4/1996 | Mueller et al. |
| 5,610,579 A | 3/1997 | Early et al. |
| 5,822,164 A | 10/1998 | Graf |
| 5,995,347 A | 11/1999 | Rudd et al. |
| 6,011,377 A | 1/2000 | Heglund et al. |
| 6,294,888 B1 | 9/2001 | Becker |
| 6,551,065 B2* | 4/2003 | Lee .................................. 417/32 |
| 6,642,633 B1 | 11/2003 | Yang |
| 6,697,244 B1* | 2/2004 | Bauer et al. ................. 361/93.1 |
| 7,085,116 B2* | 8/2006 | Kudo et al. .................. 361/93.6 |
| 7,804,038 B2 | 9/2010 | Bortolus et al. |
| 8,014,110 B2* | 9/2011 | Schnetzka et al. ............. 361/31 |
| 2003/0146725 A1 | 8/2003 | Griesemer et al. |
| 2004/0252423 A1* | 12/2004 | Boren ............................ 361/23 |
| 2005/0196285 A1 | 9/2005 | Jayanth |
| 2005/0270708 A1 | 12/2005 | Plemmons et al. |
| 2006/0203399 A1* | 9/2006 | Faccin ........................... 361/15 |
| 2007/0035897 A1* | 2/2007 | Simon ............................ 361/29 |
| 2008/0094768 A1 | 4/2008 | Perra et al. |
| 2008/0174257 A1* | 7/2008 | Schnetzka et al. ........... 318/434 |
| 2009/0064957 A1 | 3/2009 | Grybush |
| 2009/0109632 A1* | 4/2009 | Rispoli et al. ................ 361/724 |
| 2009/0147412 A1* | 6/2009 | Kojovic et al. ................ 361/36 |
| 2009/0167229 A1* | 7/2009 | Brunner et al. ............. 318/503 |
| 2010/0116595 A1* | 5/2010 | Kang et al. ................... 187/289 |
| 2010/0321032 A1 | 12/2010 | Holce et al. |
| 2011/0116196 A1* | 5/2011 | Kellis et al. .................... 361/30 |
| 2011/0216450 A1* | 9/2011 | Cheng et al. ................... 361/35 |
| 2012/0092797 A1 | 4/2012 | Reeder et al. |
| 2012/0187886 A1* | 7/2012 | Mack et al. ................. 318/503 |
| 2013/0235494 A1 | 9/2013 | Holce et al. |
| 2013/0241456 A1 | 9/2013 | Perra et al. |

FOREIGN PATENT DOCUMENTS

| | | |
|---|---|---|
| JP | 09-298830 A | 11/1997 |
| JP | 2005-188956 | 7/2005 |
| KR | 20-2010-0007087 | 7/2010 |

OTHER PUBLICATIONS

International Preliminary Report on Patentability received for PCT Patent Application No. PCT/US12/54037, dated Mar. 10, 2014, 24 pages.

International Search Report and Written Opinion received for PCT Patent Application No. PCT/US12/54003, dated Dec. 24, 2012, 7 pages.

International Search Report and Written Opinion received for PCT Patent Application No. PCT/US12/54037, dated Dec. 21, 2012, 5 pages.

* cited by examiner

MOTOR PROTECTION AND CONTROL APPARATUS, SYSTEM, AND/OR METHOD

RELATED APPLICATIONS

This application is a nonprovisional of, and claims the benefit of priority from, U.S. Provisional Patent Application No. 61/531,610, filed Sep. 6, 2011, which is hereby incorporated by reference in its entirety.

COPYRIGHT NOTICE

© 2012 Franklin Control Systems, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d), (e).

TECHNICAL FIELD

The present application is directed to the field of motor protection for industrial automation systems, HVAC systems, pumping systems, and similar implementations, and, in particular, to motor starters and related electronics offering protection and/or control of such motors.

BACKGROUND

In building automation systems, heating, ventilation, and air conditioning (HVAC) installations, pumping systems, and other industrial implementations, it is common to use starters or starter mechanisms to control and protect motors. Starters for motors and the like are generally well known in the art. Typical starters comprise thermal trip elements combined with contactors to disconnect a motor from line power in the event of an undesirable operating condition. The National Electric Code (NEC) classifies combination starters as devices that provide thermal overload protection and motor disconnect functionality.

Key components of a traditional starter include an electromagnetic contactor and an overload relay. The circuitry of such traditional starters offers both motor control and motor protection functionality via a single device that is ideally specifically selected or calibrated for the particular motor being controlled. Operation of the motor (e.g., starting and stopping the motor, etc.) can be controlled through modulation of the contactor, which includes separable contacts that are electromechanically/electromagnetically operated by an energized or de-energized coil. Closing the contacts allows line power to energize the motor, while opening the contacts cuts of power from the motor.

As mentioned above, starters also are able to provide thermal protection (i.e., overload protection) to a motor to protect it against unfavorable operating conditions. Traditional starters typically include an overload relay provided for this purpose. Overload conditions occur when equipment is operated in an electrically undamaged circuit in excess of the normal full load current rating (e.g., the conductors carry current in excess of the rated amperage). The overload is detected by the overload relay with reference to the applicable current trip point (expressed as a trip curve, which designates trip points as a function of current and time for a given motor classification). Overload conditions persisting for a sufficient amount of time can damage the motor, conductors, or other equipment. The terms "overload", "overload protection" and "overload relay" are defined by the National Electrical Manufacturers Association (NEMA) standard ICS2, which is hereby incorporated by reference in its entirety. In the past, typical overload relays were implemented using heater/detector elements, such as using bimetallic relays or thermal heater elements. More recently, however, electronic overloads have been increasingly used. Electronic overloads may include a current transformer or other current sensor to detect and monitor current supplied to the motor.

For simple electromechanical motors, a traditional starter apparatus with control and overload protection functionality generally provides adequate motor protection if it is property calibrated to the specific motor it is protecting. Each classification of motor has its own applicable overload tollerances and operating parameters. Accordingly, starters that operate motors are required to employ overload relays and corresponding overload trip circuits that are specifically selected and calibrated in order to ensure that the proper level of thermal protection is afforded to the specific motor (or class of motor) being protected. Traditional calibration procedures require an installer to set a trip point manually by dialing one or more potentiometers on an electronic overload relay to a known parameter value, such as the full-load-amperage ("FLA") rating of the motor, as specified on the motor nameplate and/or on system schematics.

The requirement for properly calibrated protective equipment can pose a problem in situations where several starters are shipped in bulk to an original equipment manufacturer (OEM), and the OEM ships numerous starters in bulk to a job site. Often, the starters arriving at the job site may not be marked or labeled. Installers frequently install the unlabeled starters inappropriately, and then attempt to start attached motors without ensuring proper calibration of the starter. Such procedures are dangerous and can result in damage to equipment, personal injury, or worse. A similar problem can develop if system demands or equipment change, such as when a fan or other equipment is added or ductwork is changed in an HVAC system, or when a motor or pump, etc. is added, removed, or changed out of an installation. Failure to ensure that the starter is, or remains, properly calibrated for the new load it is protecting and/or controlling can result in unintended and/or undesirable consequences.

SUMMARY

While starters are well known in the art, present embodiments provide novel and nonobvious improvements to solve problems Applicants have discovered with conventional product offerings and traditional installations. Present embodiments can provide integrated novel and nonobvious functionality, either as a stand-alone overload relay device, or consolidated into a unitary starter housing, thus offering improved protection with significant cost savings, facilitated installation/operation, and other advantages and/or improvements over conventional starters.

In particular, improved overloads and starters can be provided to offer enhanced and substantially automatically applied motor protection functionality, regardless of whether the overload or starter was initially calibrated or calibrated properly. Substantially automatic protection can be offered as embodied in a safety starter consistent with the present application. Such a safety starter can be designed to protect and control the motor even if someone has not set up a trip point based on full load running current/amperage (FLA), or otherwise not calibrated the starter. Starters can be designed to protect the motor automatically against an overload condition by measuring, among other possible parameters, the starting current characteristics and comparing it to known motor starting condition values. Measured parameters, such as inrush current, can be used, at least in part, to determine if the motor's running current falls (or stays) within one or more predefined ratios or ranges of acceptable current values. If so, then the motor can be assumed to be running properly. If the running current is outside of the predefined range, the starter can provide a fault and/or warning annunciation/message to indicate that it is out of calibration and needs to be recalibrated, and/or it can trip and a relay can cut off power to the motor, thus reducing the risk of equipment damage. An end user can be offered a jumper switch and/or other input interface to select if the starter will annunciate and/or trip if a problem is detected.

Electronic overload components or overload components integrated into smart starters, as described herein, can be configured to provide various advantageous motor-protection features including, without limitation, locked rotor protection, cycle fault protection, out-of-calibration protection, stall protection, and maximum start time protection, etc. This functionality can be built into and automatically available with overload relays and/or starters employing such overloads. By installing a safety starter automatically offering such motor protection features, one can be substantially assured that the starter can offer at least an initial level of motor protection and control functionality on first start, regardless of whether the starter was calibrated or calibrated properly. Starters as disclosed herein can also substantially enable one or more motor-protection features as an automatic, ongoing level of protection during motor operation. A suitable microcontroller and/or microcontroller-based control board can be used, at least in part, to monitor the specified parameters and initiate proper procedures for error handling, fault annunciation, and modulation of electronic components to protect the motor and/or related equipment.

Additional aspects and advantages of this invention will be apparent from the following detailed description of preferred embodiments, which proceeds with reference to the accompanying drawings.

DETAILED DESCRIPTION

The following description discloses various embodiments and functionality associated with the starter apparatuses, systems, and methods for use, at least in part, in applications such as building automation, industrial systems automation, heating, ventilation, and air conditioning (HVAC) installations, and applications including the control and protection of motors and electro mechanical devices driven by motors, such as pumps, fans, conveyor belts, etc., to name but a few illustrative examples systems presented for purposes of illustration and not by way of limitation.

In particular, the subject matter of the present application and the detailed starter embodiments described herein are preferably adapted for providing substantially automatic protection for motors regardless of whether the protective equipment was initially calibrated, or calibrated correctly. Those skilled in the art will appreciate that the advantageous functionality presently described can be embodied as a standalone overload (such as an electronic overload relay), or as a starter or combination starter embodiment including such overload protection as a component.

Figure 1:
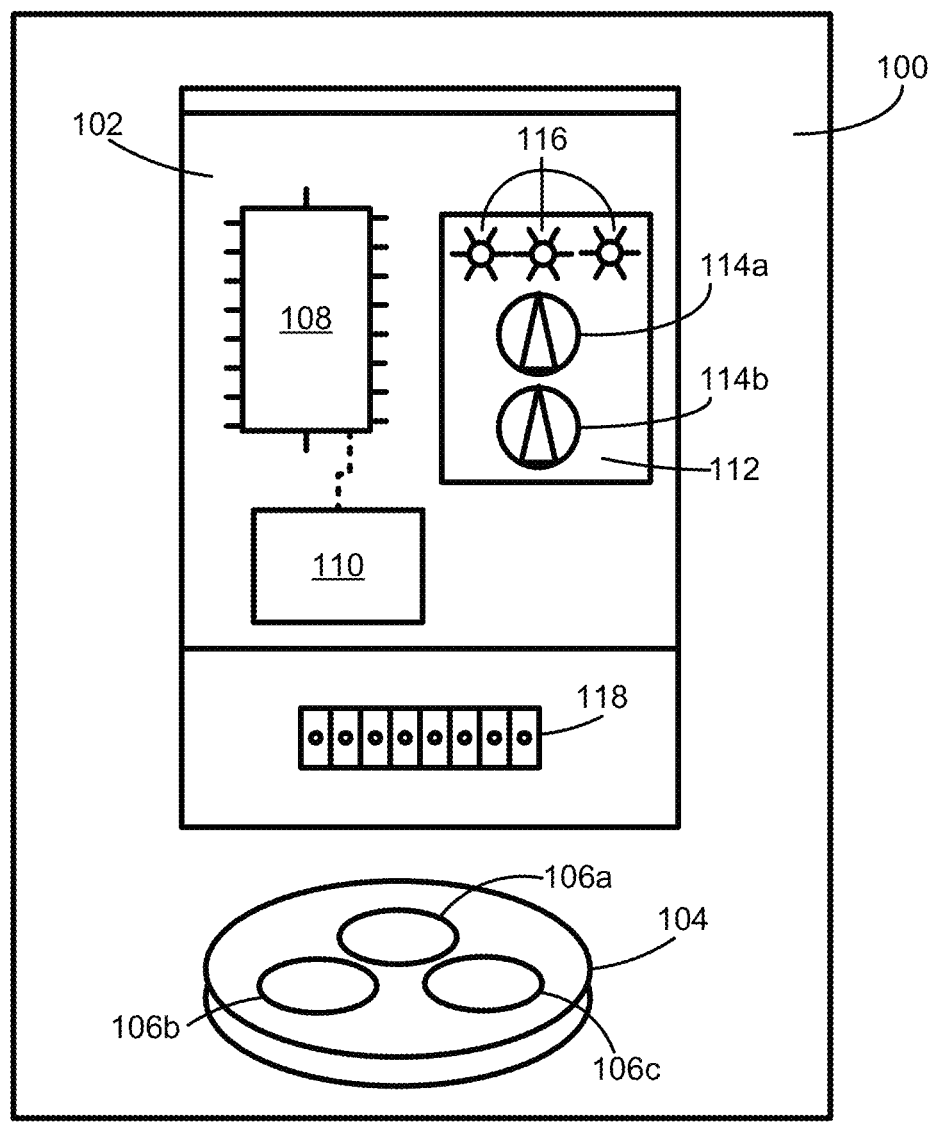
FIG. 1 illustrates one embodiment of a starter apparatus consistent with the claimed subject matter.

In one aspect, consistent with the present subject matter, starter functionality can be enabled, at least in part, through one or more embodiments of a starter control module (SCM) embodiment and related technology. An SCM can include components such as a meter base and a custom interface printed circuit board assembly to cooperatively facilitate motor control and/or protection. The specific electronics comprising the SCM can be further adapted, selected, and/or configured so as to facilitate optimization for an particular intended operating environment/application, such as to substantially represent an energy management starter (e.g., for HVAC implementations, etc.), a building automation starter (e.g., for industrial control applications, etc.), or an intelligent pump starter (e.g., for pump control applications, etc.). As used here, the term "starter control module" or "SCM" refers to the actual printed circuit board and related control board electronics and mechanical interfaces, rather than an entire integrated starter controller. For example, one SCM embodiment can be integrated into a single unitary enclosure along with an integrated overload relay and any required electromagnetic contactors to comprise a motor starter. However, a SCM embodiment can also be offered and/or employed modularly, such that it can be used as a standalone component to work with third-party supplied contactors, overload relays, and/or external current sensors, etc. temp FIG. 1 illustrates one embodiment of a starter control module consistent with the present subject matter. With particular reference to FIG. 1, the starter control module 100 is depicted as including a control board 102 and a meter base 104. Meter base 104 of FIG. 1 includes three current sensor embodiments 106a through 106c. Control board 102 includes a microprocessor 108 functionally coupled with memory 110, which can include firmware instructions and/ or programmable memory storage. Control board 102 also can include a user interface assembly 112. The user interface assembly embodiment 112 illustrated in FIG. 1 includes two user selectable switches 114a through 114b as well as pilot light indicators 116 suitable for indicating to the user the present operating mode of starter control module 100. Starter control module 100 is also depicted as having a terminal board 118, illustrating but one example of an input/output wiring interface. Those skilled in the art will readily appreciate that additional, alternative, or fewer components than those illustrated in FIG. 1 could also be employed consistent with the present subject matter.

Figure 2:
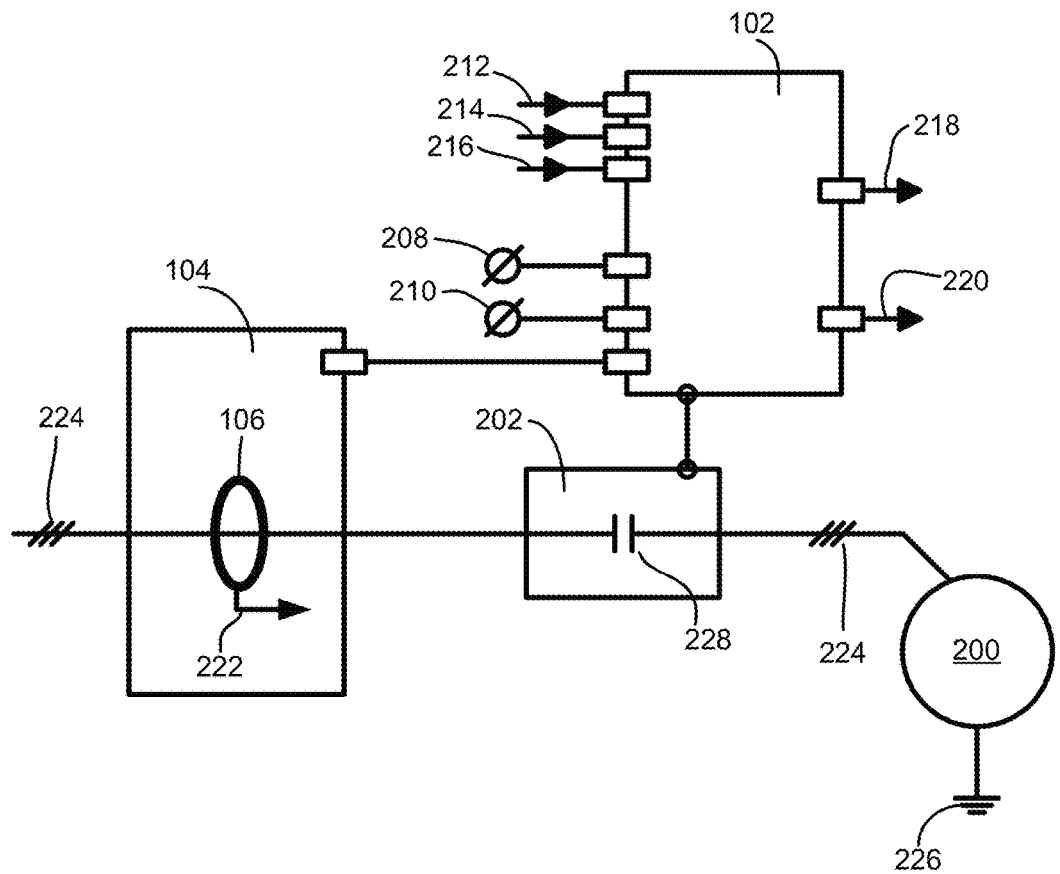
FIG. 2 illustrates one embodiment of a system schematic for a starter embodiment consistent with the claimed subject matter.

For further illustration, and to facilitate discussion, FIG. 2 illustrates a schematic of one starter embodiment suitable, at least in part, for implementing and/or embodying the claimed subject matter. A microprocessor-based printed circuit board for such a starter embodiment can employ unique customized firmware to, at least in part, provide the desired advantageous functionality. This can be embodied as a starter control board that can accommodate building automation control logic and communications. With particular reference to FIG. 2, a three-phase motor 200 operates on three-phase power lines 224. The starter embodiment of FIG. 2 includes a control board 102 and a meter base 104 similar to those depicted in FIG. 1 and previously described. As illustrated in FIG. 2, the meter base 104 can include a current sensor. Of course a current sensor, such as a current transformer, could be used independently, consistent with the present subject matter, without requiring the additional components of the meter base. In the embodiment illustrated in FIG. 2, the current sensor is depicted as a current transformer monitoring line current (however, those skilled in the art will appreciate that alternative current sensing mechanisms could also be implemented consistent with the claimed subject matter). Current sensor 106 provides a current measurement signal, voltage, or other output 222 suitable for overload protection purposes (and/or circuit metering, if such functionality is desired). While FIG. 2 illustrates one current sensor 106, it is understood that current could be measured from one or more of the 3-phase power lines 224.

Continuing with the starter embodiment illustrated in FIG. 2, control board 102 can also include user interface controls, such as control switches 208, 210. Control switches 208, 210 can allow a user to select between operating the starter embodiment by hand commands, or commands driven from a remote controller, such as might be implemented in a building automation system. Accordingly, control board 102 can be configured for receiving multiple control inputs, such as an auto-low command 212 an auto-high command 214 and a shutdown command 216. Suitable output signals can also be generated by control board 102, such as run status signal 218 or fault signal 220.

Consistent with the present subject matter, motor control board 102 can be employed to control and protect motor 200 via coordinated operation of contactor 202, including separable contacts 228. As illustrated in the starter embodiment of FIG. 2, an overload relay, which can include current transformer 106 depicted in meter base 104 to use current measurement 222 can provide overload protection to motor 200 via contactor 202. Control board 102 monitors the operating state and appropriately controls the contactor as instructed by way of input signals 212, 214, 216, and/or user interface switches 208, 210.

Continuing with FIG. 2, control board 102 can also include a status output relay to provide a run status indication 218 as a built-in feature. Such embodiments can use the same sensors for multiple aspects of alternative functionality. For example, current sensor 106, can be used to provide overload protection and a run status indication 218. The functionality of such embodiments can include auto-sensing for status annunciation based on the monitored current 222 being at least a pre-specified percentage of full-load amperage (FLA).

As previously mentioned, electronic overloads and starter embodiments as described herein are preferably adapted for providing substantially automatic protection for motors regardless of whether the protective equipment was initially calibrated, or calibrated correctly. Those skilled in the art will appreciate that the advantageous functionality presently described can be embodied as a standalone overload (such as an electronic overload relay), or as a starter or combination starter embodiment including such overload protection as a component. Motor-protection features including, without limitation, locked rotor protection, cycle fault protection, out-of-calibration protection, stall protection, and maximum start time protection, etc., can be enabled, at least in part, through cooperation between hardware, software, and/or firmware components of embodiments as described herein. The methodologies, heuristics, and procedures embodiments can use to detect and protect against each expected and/or potential fault condition can be programmed directly into firmware and/or into machine-executable instructions (e.g., representing state machine procedures and/or logic) stored in memory on or accessible by a microprocessor-based control board, or other suitable location within the relevant electronics. Given the input current being monitored, the current response over time, and be provided FLA setting indicated for overload protection, present embodiments can automatically provide the desired motor protection and/or control by executing the stored instructions.

In order to, at least in part, enable the protective functionality described herein, overloads and/or starters (hereinafter "protection and control equipment"), can monitor current drawn by the motor during startup and/or operation. Current transformers or other current sensing components of the overload can be used to monitor the current. The monitor current is then compared to known, expected current characteristics for the particular motor being controlled/protected. For example, a motor classified as a trip-class 10 motor will exhibit certain expected current characteristics at startup and displayed over time in a proper operating condition. Similarly, expected and/or potential fault conditions will display varying current characteristics which are substantially consistent for motors of that classification. Similarly, trip-class 20 motors also substantially exhibit consistent current draw behavior and/or characteristics depending on the operating conditions affecting the motor.

Figure 3:
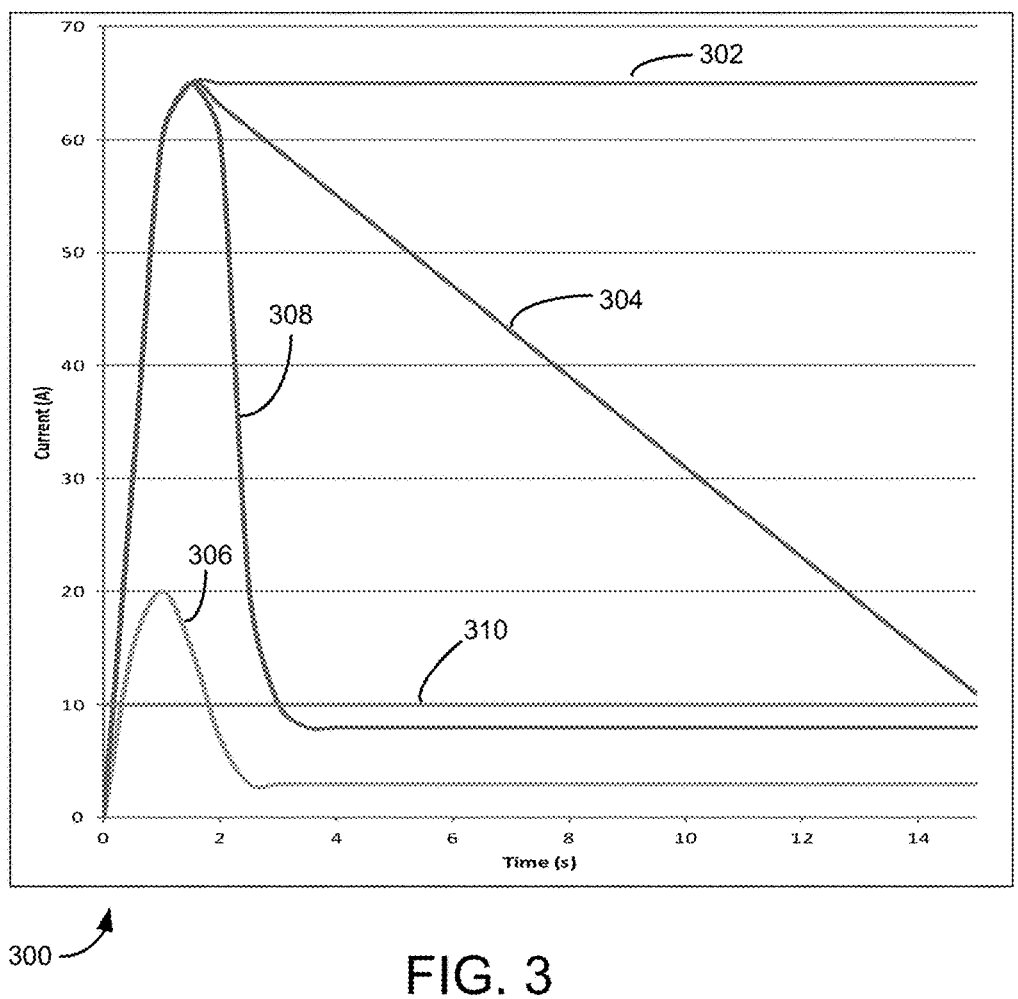
FIG. 3 depicts one embodiment of current-time graph illustrating protective characteristics consistent with the claimed subject matter.

FIG. 3 illustrates one example of a current-time graph plotting current versus time characteristics for normal motor operation, and illustrative examples of various potential fault conditions and/or uncalibrated motor operation. With particular reference to FIG. 3, time is plotted on the horizontal axis and current is plotted on the vertical axis of graph 300. The various current responses illustrated over time in graph 300 illustrate examples of a motor normal start condition 308, as well as a locked rotor condition 302, a maximum-time fault condition 304, and an out-of-calibration condition 306. These various current responses are illustrated with reference to a to full load amperage (FLA) indication 310.

With particular reference to FIG. 3, the protection methodology can begin when an installer or motor operator provides (or inadvertently omits to provide) a set FLA value, such as FLA value 310 illustrated in FIG. 3 as being 10A. The supplied FLA value is typically obtained from the motor nameplate, system schematic diagrams, and/or other convenient and easily ascertainable sources. The FLA is provided to motor overload protective equipment as part of a proper calibration procedure. However, if the FLA value is not provided to present embodiments, or is provided as indicating a value inconsistent with the actual FLA of the motor being controlled/protected, the automatic protection functionality of the present embodiments will still protect the motor. The undesirable operating conditions are detected and avoided, at least in part by comparing one or more of starting current, in rush/peak current, running current overtime, and the indicated or set-point FLA value, and comparing the relationship between certain of these values to the corresponding expected relationships indicative of proper or improper operating conditions for the motor.

To illustrate this concept with reference to FIG. 3, normal current characteristics are depicted as response 308. As can be seen with response 308, the initial current on startup quickly spikes from zero to a peak value (illustrated here as approximately 65 A) before rapidly dropping back down to a percentage under FLA value 310. This in-rush spike is indicative of startup conditions for inductive motors. For example, it has been empirically determined that the majority of traditionally applicable motors exhibit and inrush current spike of approximately 6 to 12 times the FLA value. However, with the introduction of more high-efficiency motors, the inrush spike range representative of most motors can be more inclusively indicated as 5 to 13 times FLA. In other words, normal operating run current typically falls between 1/13 and 1/5 of the inrush current. To properly accommodate the expected inrush current and starting a motor, overload protection devices employ standard inverse trip curves commonly known for various motor classifications. These trip curves indicate the appropriate time response for overload protection to avoid damaging the motor with access current for prolonged periods of time. For example, in inverse trip curve will indicate how long a motor should be maintained at a particular current value before the overload trips. If, however, the current does not drop off appropriately after the inrush spike, or if the running current is not within an acceptable range, then present embodiments will automatically detect such occurrence as indicating a fault condition and/or requirement for calibration.

Continuing with specific reference to FIG. 3, the current response for locked rotor 302 is illustrated. With locked rotor, the current essentially remains at peak value, or does not drop off after the inrush peak. If this condition is detected, via the circuit current monitoring components, to occur for a predefined amount of time, such as three seconds, as but one example, a locked rotor fault can be given, which can be indicated through an alarm, signal annunciation, or a trip.

The maximum-time-to-start fault 304 is also illustrated in FIG. 3, and can be characterized by the current steadily dropping after the peak inrush value, but not dropping quickly enough to be indicative of normal operating characteristics 308. If the monitored ongoing current, even though dropping, does not drop off rapidly enough to enter a safe operating window (e.g. between 1/13 and 1/5 of the measured peak value, as but one example) within a predetermined amount of time, such as the 10 seconds of startup overload condition allowed for a trip-class 10 motor (or 20 seconds for a trip-class 20 motor), the maximum-time-to-start fault can be indicated, and handled via fault annunciation, tripping, or other suitable response. Regardless of the FLA setting or $i^2t$ curve, present embodiments can still automatically protect the motor against potentially damaging overload conditions.

One example of an out-of-calibration fault 306 is also illustrated in FIG. 3. This condition could exist, as but one example, if an installer inaccurately indicates a high FLA value in order to try and avoid an overload trip (for example, if having already experienced one overload trip, and seeking to avoid the nuisance of restarting the system in the event of other overload trips, the installer indicates a higher than actual FLA setting). Regardless of the inappropriately indicated FLA setting, present embodiments can detect that the motor is not operating within acceptable operating range. If the ratio of run current to start current is outside of a predefined acceptable range, present embodiments can alarm and/or trip, or provide a suitable indication that the equipment requires calibration, or recalibration. Current response 306 indicates an incorrect calibration, in that the inrush spike (illustrated at 20 A) is not between 5 to 13 times the indicated FLA of 10 A. This is detected, through present embodiments, by measuring the actual inrush and dividing by, as one example, the outer range of the expected inrush multiplier over FLA. For example, as presently illustrated, if the inrush current is expected to be between 5 to 13 times the FLA, dividing the measured inrush peak current by five, and comparing it to the measured running current, out-of-calibration faults can be detected. In other words, normal running current should be between 1/13 and 1/5 of the peak current value. Accordingly, regardless of an intentionally or accidentally incorrect FLA value being supplied, present embodiments will still function appropriately to protect the motor, or detected discrepancy and require proper calibration.

Those skilled in the art will also appreciate that additional protective functionality can be employed using embodiments configured as described herein. For example, similar to locked rotor fault protection, stall protection can be afforded to motors through present embodiments. In a stall condition, even if occurring after the startup mode of the motor has completed, the current would be expected to spike outside of the normal acceptable operating range and remain at and/or near the spike to value outside of the normal acceptable operating range. As such, present embodiments can substantially help ensure that motors operate within a safe operating range, whether at startup, or further during operating mode. Additional levels of protection, such as cycle fault protection can also be provided consistent with present embodiments. For cycle fault protection, a starter embodiment, or an overload relay embodiment cooperatively working with a starter control board operating a contactor supplying current to the motor, the amount of contactor start signals being detected can indicate a cycle fault. For example, if the contactor is being operated at a rate of over 1200 starts per hour, a cycle fault can be indicated through fault indication and/or a trip.

It will be obvious to those having skill in the art that many changes may be made to the details of the above-described embodiments without departing from the underlying principles of the invention. The scope of the present invention should, therefore, be determined only with reference to the following claims.

The invention claimed is:

1. A system for protecting a motor, independent of the occurrence or accuracy of an initial calibration, the system comprising:
   an overload circuit including a current sensor for sensing at least a peak inrush current and a running current supplied to a motor;
   a contactor provisioned for selectively supplying power to the motor; and
   a microprocessor-based control board, wherein the control board implements executable instructions stored in non-transitory memory for calculating an acceptable operating range for the running current, the acceptable operating range being calculated as a fraction range of the peak inrush current, and the control board is configured to indicate a fault condition if the running current does not enter the acceptable operating range within a predetermined amount of time or stay within the acceptable operating range during continued operation of the motor.

2. The system of claim 1, wherein the executable instructions further instruct the overload circuit to trip in response to the fault condition.

3. The system of claim 2, wherein, in response to the trip, the contactor disconnects the supply of power to the motor.

4. The system of claim 1 wherein, the control board is configured to compared a full load amperage (FLA) value provided for initial calibration of the system to the motor, and the control board is configured to indicate an out-of-calibration fault in response to the provided FLA being outside of the acceptable operating range.

5. The system of claim 1 wherein the executable instructions further include:
   identifying a provided full load amperage (FLA) value representative of initial calibration;
   comparing the provided FLA value to the acceptable operating range; and
   if the provided FLA value is not within the acceptable operating range, initiating a protective action including at least one of: annunciating an out-of-calibration fault or signaling the overload circuit to trip.

6. A method for automatically protecting a motor, independent of the occurrence or accuracy of an initial calibration, the method comprising the steps of:
   measuring peak inrush current to a motor;
   measuring running current to the motor over time; and
   employing a microprocessor-based control board implementing executable instructions stored in non-transitory memory for:
   calculating an acceptable operating range for the running current, the acceptable operating range being calculated as a fraction range of the peak inrush current;
   comparing the measured running current over time to the acceptable operating range; and
   in response to the running current not entering the acceptable operating range within a predetermined amount of time or staying within the acceptable operating range during continued operation of the motor, initiating a protective action for the motor.

7. The method of claim 6, wherein the protective action includes sending a trip signal.

8. The method of claim 6, wherein the protective action includes annunciating a fault condition.

* * * * *